(12) United States Patent
Yoshitomi et al.

(10) Patent No.: US 11,367,882 B2
(45) Date of Patent: Jun. 21, 2022

(54) MOUNT STRUCTURE OF FUEL CELL STACK

(71) Applicant: HONDA MOTOR CO., LTD., Tokyo (JP)

(72) Inventors: Ryoichi Yoshitomi, Wako (JP); Hideharu Naito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 303 days.

(21) Appl. No.: 16/544,959

(22) Filed: Aug. 20, 2019

(65) Prior Publication Data

US 2020/0067108 A1 Feb. 27, 2020

(30) Foreign Application Priority Data

Aug. 23, 2018 (JP) .............................. JP2018-156200

(51) Int. Cl.
*H01M 8/0273* (2016.01)
*H01M 8/249* (2016.01)
*H01M 8/2457* (2016.01)

(52) U.S. Cl.
CPC ......... *H01M 8/0273* (2013.01); *H01M 8/249* (2013.01); *H01M 8/2457* (2016.02); *H01M 2250/20* (2013.01)

(58) Field of Classification Search
CPC ... H01M 8/0273; H01M 8/249; H01M 8/2457
See application file for complete search history.

(56) References Cited

U.S. PATENT DOCUMENTS 9,559,378 B2 * 1/2017 Takeyama ........... H01M 8/2404
2002/0189873 A1 12/2002 Mizuno

FOREIGN PATENT DOCUMENTS

JP 2002-370544 12/2002

* cited by examiner

*Primary Examiner* — Sarah A. Slifka
(74) *Attorney, Agent, or Firm* — Amin, Turocy & Watson, LLP

(57) ABSTRACT

Mount structure of a fuel cell stack holds the fuel cell stack in a motor room of a vehicle by side mounts and a rear mount. The fuel cell stack includes a plurality of power generation cells and a stack case. A window frame having a rear window is provided in a rear surface of the stack case. A device of the fuel cell system can be inserted into the rear window. The rear mount includes a rear mount bracket attached to a window frame. The rear mount bracket is positioned is below a vehicle body frame and a rear window.

7 Claims, 5 Drawing Sheets

MOUNT STRUCTURE OF FUEL CELL STACK

CROSS-REFERENCE TO RELATED APPLICATION

This application is based upon and claims the benefit of priority from Japanese Patent Application No. 2018-156200 filed on Aug. 23, 2018, the contents of which are incorporated herein by reference.

BACKGROUND OF THE INVENTION

Field of the Invention

The present invention relates to mount structure of a fuel cell stack.

Description of the Related Art

Japanese Laid-Open Patent Publication No. 2002-370544 discloses mount structure of a fuel cell system where a fuel cell stack and a motor (traction motor) are provided in a motor room on the front side of a vehicle body. This mount structure fixedly holds the bottom surface side of the fuel cell stack through an FC frame (mount bracket) at a position above the traction motor. Further, in the mount structure of Japanese Laid-Open Patent Publication No. 2002-370544, a power control unit (device) of the fuel cell system is fixed to an upper part of the fuel cell stack.

SUMMARY OF THE INVENTION

In this regard, in some cases, in a fuel cell vehicle, the height of a space in a motor room is specified by designs of a vehicle body, and it is difficult to provide a motor, a fuel cell stack, and a device of a fuel cell system vertically in an overlapping manner (the sufficient space is not available vertically). Otherwise, in some cases, since the height of the fuel cell stack itself has a large size due to the nature of its structure, the device cannot be placed in the fuel cell vehicle.

It may be possible to consider placing the device in a lateral direction perpendicular to the vertical direction of the fuel cell stack. However, since the fuel cell stack has other structure (device(s) of the fuel cell system) in the lateral direction as well, it is difficult to simply change the position of the device.

The present invention has been made taking the above circumstances into account, and an object of the present invention is to provide mount structure of a fuel cell stack in which it is possible to firmly fix the fuel cell stack, while suitably ensuring that a sufficient space is provided for placing predetermined devices of a fuel cell system.

In order to achieve the above object, the present invention provides mount structure of a fuel cell stack. The mount structure is configured to hold the fuel cell stack at a predetermined position in a vehicle, by a plurality of mounts fixed to a vehicle body frame of the vehicle. The fuel cell stack includes a plurality of power generation cells and a stack case containing the plurality of power generation cells in a state where the plurality of power generation cells are stacked together. One side surface of the stack case is provided with a window frame having a window configured to allow a device of a fuel cell system to be inserted into the window, and at least one of the mounts includes a mount bracket positioned below the window, and the mount bracket is attached to the window frame and connected to the vehicle body frame.

In the present invention, using the mount structure of the fuel cell stack, it becomes possible to suitably ensure that a sufficient space is provided in the vehicle, by the window frame of the stack case and the mount bracket of the mount. That is, since the window is provided in one side surface of the stack case, it is possible to insert the device of the fuel cell system through the window, and achieve reduction of the space required for mounting the fuel cell system in the vehicle. Further, since the mount bracket is attached to the window frame of one side surface of the stack case while achieving the desired opening range of the window, the mount bracket can firmly and fixedly hold the fuel cell stack. In the structure, since the mount bracket for supporting the fuel cell stack is not present below the fuel cell stack, the available space is widened, and for example, even in the structure where the traction motor of the vehicle is provided below the fuel cell stack, it is possible to easily obtain the interval needed for preventing interference between these component parts.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of the present invention will be described in detail with reference to the accompanying drawings.

Figure 1:
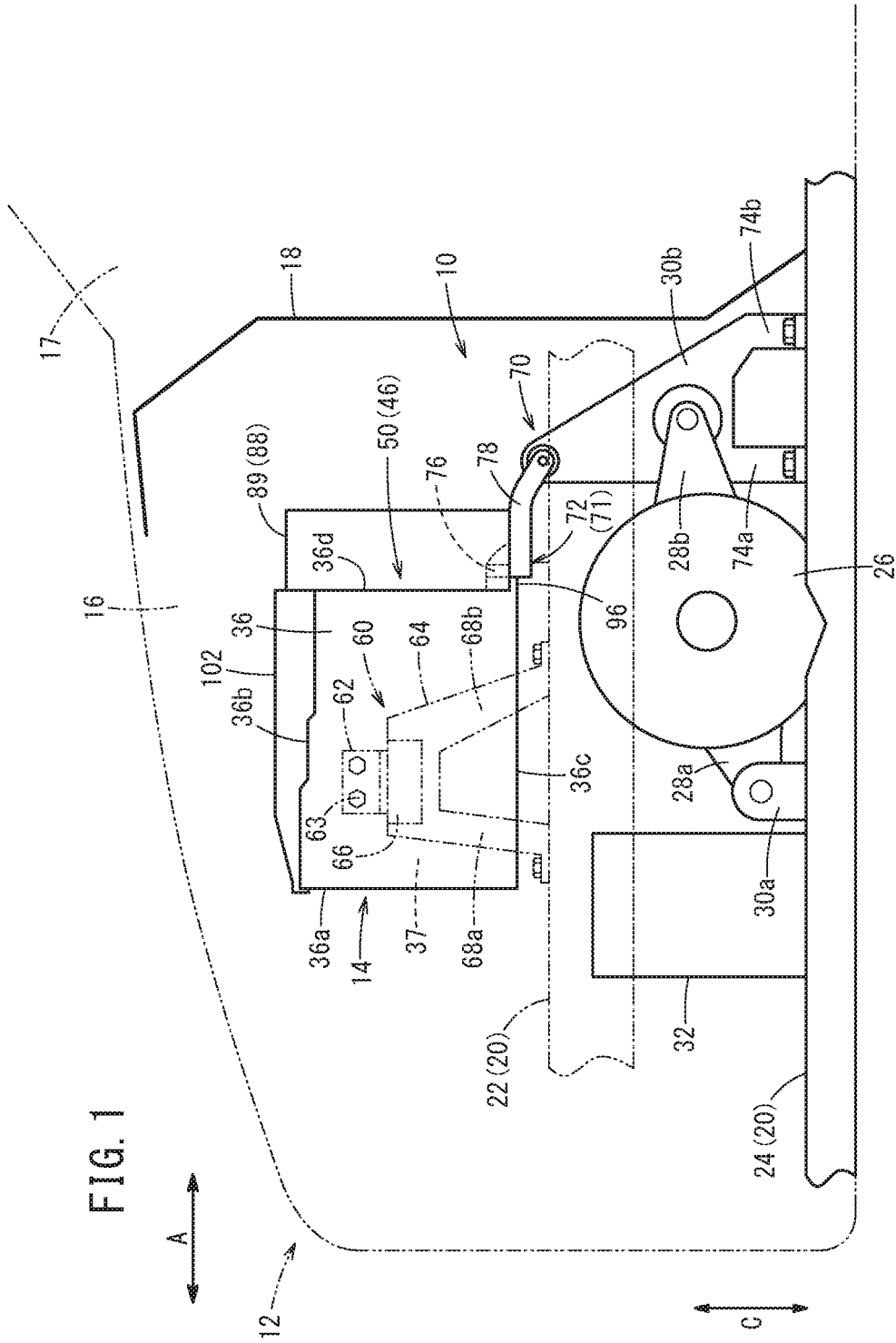
FIG. 1 is a side view schematically showing overall mount structure of a fuel cell stack according to an embodiment of the present invention.

As shown in FIG. 1, mount structure 10 of a fuel cell stack 14 according to an embodiment of the present invention is used in an application where the fuel cell stack 14 is mounted in a fuel cell vehicle 12 (hereinafter simply referred to as the vehicle 12). The fuel cell stack 14 is placed in a motor room 16 (front box) provided on a front side of the vehicle 12. The motor room 16 is isolated from a vehicle compartment 17 for passengers, by a partition wall member 18 (dashboard).

The motor room 16 includes a first vehicle frame 22 (e.g., side frame) and a second vehicle frame 24 (e.g., cross member) as part of a vehicle body frame 20. The first vehicle frame 22 extends in a front/rear direction of the vehicle 12 (in a direction indicated by an arrow A in FIG. 1), and the second vehicle frame 24 extends below the first vehicle frame 22, in the direction indicated by the arrow A and in a vehicle width direction (in a direction indicated by an arrow B: see FIG. 2). The fuel cell stack 14 is fixed to the first vehicle frame 22 and the second vehicle frame 24 through members of the mount structure 10 described later.

The fuel cell stack 14 performs power generation based on electrochemical reactions of a fuel gas and an oxygen-containing gas supplied from a fuel gas supply apparatus (not shown) and an oxygen-containing gas supply apparatus (not shown). The fuel cell stack 14 supplies power generation electrical energy generated in power generation, to a traction motor 26 provided in a motor room 16 and a battery (not shown).

Further, in the motor room 16, the traction motor 26 is provided vertically below the fuel cell stack 14 fixed using the mount structure 10. The traction motor 26 drives the vehicle 12 through a transmission, wheels, etc. The front side of the traction motor 26 is fixed to the second vehicle frame 24 through a motor bracket 28a and a front support 30a. The rear side of the traction motor 26 is fixed to the second vehicle frame 24 through a motor bracket 28b and a rear support 30b.

A power drive unit 32 (hereinafter referred to as the "PDU 32") is provided on the front side of the traction motor 26 in the motor room 16, for supplying suitable electrical energy to the traction motor 26. The PDU 32 is in the form of a three phase bridge type inverter. The PDU 32 converts power generation electrical energy (direct current electrical energy) of the fuel cell stack 14 into alternating electrical energy, and adjusts a rotational driving force of the traction motor 26 based on control of an ECU (not shown).

Figure 2:
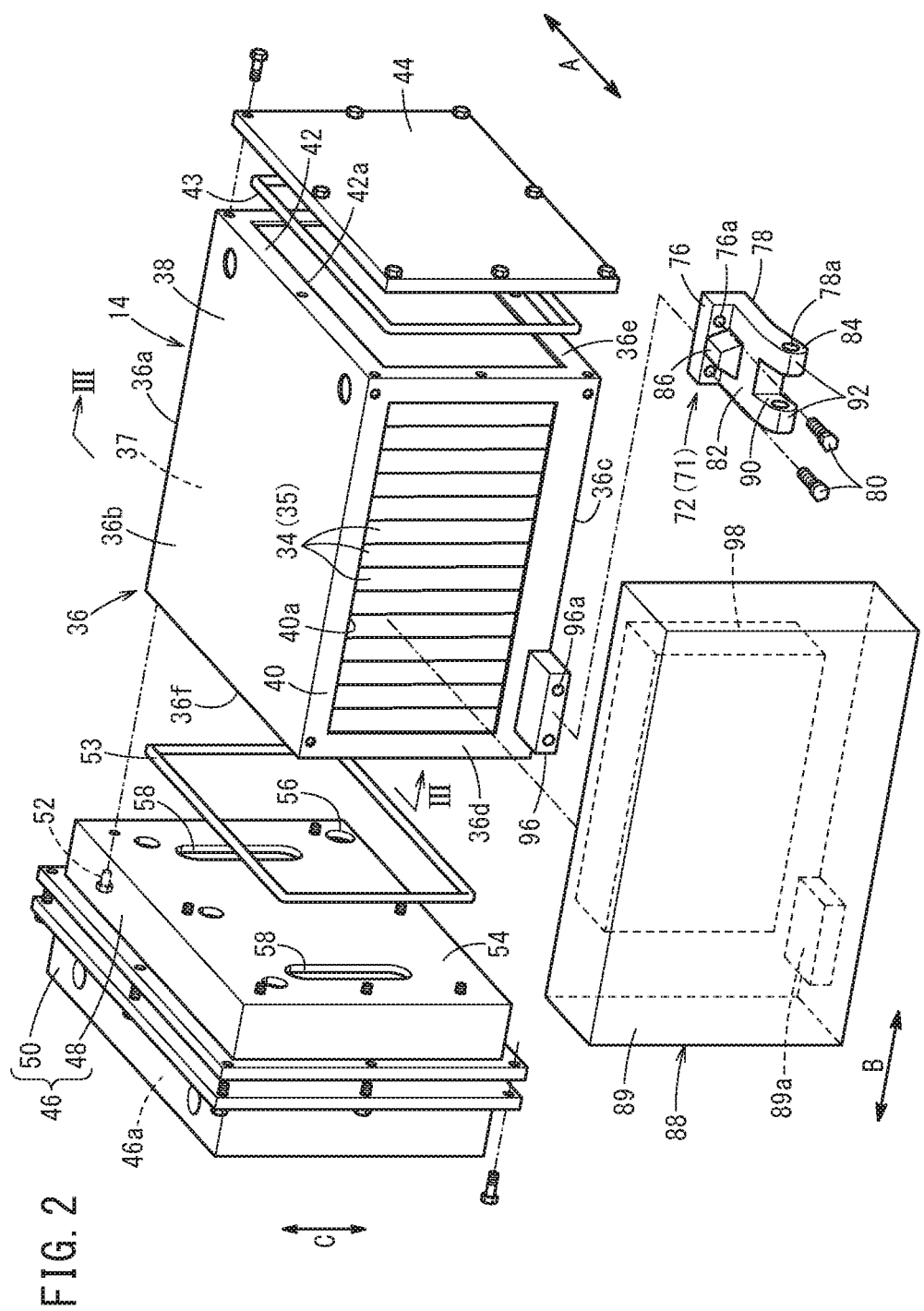
FIG. 2 is an exploded perspective view showing part of assembling of the fuel cell stack.

As shown in FIG. 2, the fuel cell stack 14 includes a plurality of power generation cells 34 for performing power generation actually, and a stack case 36 containing the plurality of power generation cells 34 that are stacked together. In the state where the fuel cell stack 14 is mounted in the vehicle 12, the power generation cells 34 are stacked together in a vehicle width direction of the vehicle 12 such that electrode surfaces of the fuel cell stack 14 are oriented upright.

The stack case 36 includes walls 38 on a front surface 36a, an upper surface 36b, and a bottom surface 36c of the stack case 36. The walls 38 extend along, and cover the entire surfaces of the stack case 36. On the other hand, a rear surface 36d of the stack case 36 is in the form of a window frame 40 (in the form of a frame) having a rear window 40a. Further, side surfaces 36e, 36f of the stack case 36 in the vehicle width direction are formed on side frames 42 each having a side window 42a.

At one end of the power generation cells 34 in a stacking direction (vehicle width direction), a first terminal plate (not shown) is provided, and a first insulating plate (not shown) is provided outside the first terminal plate. The first terminal plate and the first insulating plate are placed in the stack case 36. A first end plate 44 is attached to a side surface 36e of the stack case 36 at one end of the power generation cells 34 in the stacking direction. At the other end of the power generation cells 34 in a stacking direction (vehicle width direction), a second terminal plate (not shown) is provided, and a second insulating plate (not shown) is provided outside the second terminal plate. The second terminal plate and the second insulating plate are placed in the stack case 36. Further, an auxiliary device case 46 is attached to the side surface 36f of the stack case 36 at the other end of the power generation cells 34 in the stacking direction.

The first end plate 44 covers the side window 42a of the stack case 36, and applies a tightening load in the stacking direction to a stack body 35 of the power generation cells 34.

A seal member 43 made of elastic material is provided between the stack case 36 and the first end plate 44. The seal member 43 is formed around a joint surface which joins the side frame 42 of the side surface 36e and the first end plate 44 in a circumferential direction.

The auxiliary device case 46 is a protection case for protecting auxiliary devices (not shown) of the fuel cell system. The auxiliary device case 46 is fixed at a position adjacent to the stack case 36 in the horizontal direction. The auxiliary device case 46 includes a recessed first case member 48 screwed to the stack case 36, and a recessed second case member 50 joined to the first case member 48. An accommodation space 46a accommodating the auxiliary devices is formed inside these members. Examples of auxiliary devices placed in the auxiliary device case 46 include hydrogen system auxiliary devices such as pipes, an injector, a hydrogen pump, and valves (hydrogen gas supply apparatus: device(s) of the fuel cell system).

The first case member 48 is joined to the stack case 36 using bolts 52. The first case member 48 includes a wall 54 as a partition between an internal space 37 of the stack case 36 and the accommodation space 46a of the auxiliary device case 46. The first case member 48 covers the side window 42a at the other end of the stack case 36 in the stacking direction. The wall 54 functions as a second end plate which applies a tightening load to the stack body 35 of the power generation cells 34 in the stacking direction. A seal member 53 made of elastic material is provided between the stack case 36 and the first case member 48. The seal member 53 is formed around a joint surface which joins the side frame 42 of the side surface 36f and the first case member 48 in a circumferential direction.

A plurality of ventilation holes 56 connecting the internal space 37 of the stack case 36 and the accommodation space 46a of the auxiliary device case 46 together, and piping openings 58 are provided in the wall 54 of the first case member 48. The ventilation holes 56 are holes for performing ventilation inside the stack case 36. The piping openings 58 are holes for insertion of pipes connected to an oxygen-containing gas supply passage, an oxygen-containing gas discharge passage, a fuel gas supply passage, a fuel gas discharge passage, a coolant supply passage, and a coolant discharge passage (all not shown) provided in the fuel cell stack 14.

As shown in FIG. 1, side mounts 60 (mounts) as part of the mount structure 10 of the fuel cell stack 14 are provided for the first end plate 44 and the auxiliary device case 46 (wall of the second case member 50) on both sides of the fuel cell stack 14 in the vehicle width direction, respectively. Each of the pair of side mounts 60 in the vehicle width direction includes a plate member 62 which is bent in an L-shape, and the plate member 62 is screwed to the front side of the first end plate 44 and the auxiliary device case 46 in the direction indicated by the arrow A using a plurality of bolts 63.

The pair of side mounts 60 include a shock absorber 64 fixed to one end of the fuel cell stack 14 through the plate member 62. The shock absorber 64 includes an absorber body 66 as part of a seal liquid mount, a plurality of (e.g., two) legs 68a, 68b for supporting the absorber body 66 and attached to the first vehicle frame 22. The legs 68a, 68b have different sizes. For example, the leg 68b is longer than the leg 68a.

The mount structure 10 of the fuel cell stack 14 includes, in addition to the side mounts 60, a rear mount 70 (mount) for fixedly holding the rear surface 36d of the fuel cell stack 14. The rear mount 70 includes the above described rear support 30b and a mount bracket 71 (rear mount bracket 72) directly attached to the stack case 36.

The rear support 30b rotatably supports the rear mount bracket 72 (fuel cell stack 14), and elastically supports the rear side of the traction motor 26 through the motor bracket 28b. Legs 74a, 74b are provided on the lower part of the rear support 30b. The legs 74a, 74b are screwed to the second vehicle frame 24. The legs 74a, 74b have different sizes. For example, the leg 74a is longer than the leg 74b.

Figure 3:
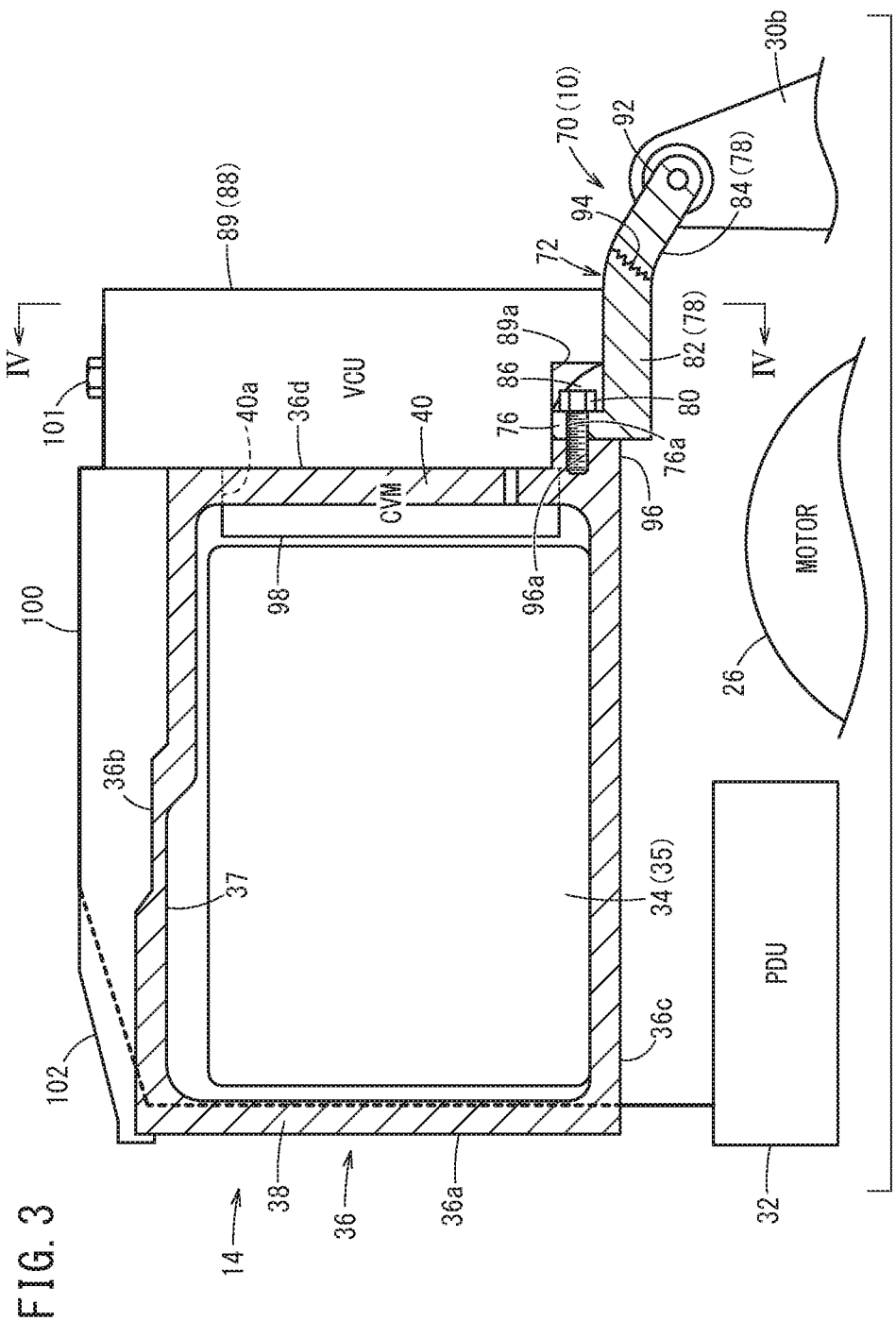
FIG. 3 is a cross sectional view taken along a line III-III in FIG. 2.

The rear support 30b extends upward from the second vehicle frame 24 to a position above the traction motor 26. The rear mount bracket 72 is fixed (screwed) to an upper part of the rear support 30b. As shown in FIGS. 2 and 3, the rear mount bracket 72 is coupled to the rear surface 36d of the stack case 36.

The rear mount bracket 72 includes a case attachment 76 facing, and attached to the stack case 36, and a vehicle body attachment 78 continuous with the lower part of the case attachment 76. The vehicle body attachment 78 extends rearward, and is attached to the rear support 30b (i.e., connected to the vehicle body frame 20).

The case attachment 76 protrudes from the vehicle body attachment 78 in a height direction (in a direction indicated by an arrow C) to by a short distance. The case attachment 76 has some thickness in a front/rear direction (indicated by the arrow A), and has a block shape having a predetermined length in a width direction (indicated by the arrow B). First holes 76a for tightening bolts 80 which tighten the rear mount bracket 72 are provided adjacent to both sides of the rear surface of the case attachment 76 in the width direction. The pair of first holes 76a pass through the rear surface in the direction indicated by the arrow A, respectively.

The vehicle body attachment 78 and the case attachment 76 have the same width. The vehicle body attachment 78 is coupled to the case attachment 76 with a bent at an angle of 90°, and extends rearward and downward. In a side view, the front portion of the vehicle body attachment 78 coupled to the case attachment 76 is a flat portion 82 which extends substantially in parallel to the second vehicle frame 24. On the other hand, the portion of the vehicle body attachment 78 coupled to the rear support 30b on the rear side of the position in the middle of the vehicle body attachment 78 in the front/rear direction has an arc shaped portion 84 extending downward obliquely in an arc shape.

A ridge 86 is formed at the center of the upper surface of the flat portion 82 (vehicle attachment 78) in the width direction. The ridge 86 is continuous with both of the case attachment 76 and the vehicle body attachment 78, and reinforces the bent portion of the rear mount bracket 72. The rear portion of the ridge 86 extends to a position in the middle of the flat portion 82. The part of the upper surface of the flat portion 82 other than the position where the ridge 86 is formed contacts the lower surface of a voltage control unit 88 (hereinafter referred to as the VCU 88) described later, and is capable of supporting the VCU 88.

The arc shaped portion 84 includes a cutout 90 at its center in the width direction, and includes a pair of extensions 92 extending rearward and downward on both sides of the cutout 90 in the width direction. Second holes 78a pass through the pair of extensions 92, on the rear side, in the vehicle width direction, respectively. Bolts (not shown) are screwed into the second holes 78a, and the second holes 78a are fixed to the upper portion of the rear support 30b provided in the cutout 90.

The rear mount bracket 72 is configured to be broken apart easily when an impact is applied to the fuel cell stack 14, e.g., in a collision accident of the vehicle 12. Specifically, the rear mount bracket 72 includes a fragile portion 94 in a rear part of the flat portion 82 (position where the ridge 86 is not present). For example, the fragile portion 94 is thin in comparison with the other part of the rear mount bracket 72. When an impact is applied, the fragile portion 94 is broken down before the other part (including the stack case 36) is damaged. The position of the fragile portion 94 is not limited specially. For example, the fragile portion 94 may be provided, e.g., at the border between the flat portion 82 and the arc shaped portion 84, or at the border between the case attachment 76 and the vehicle body attachment 78.

Figure 4:
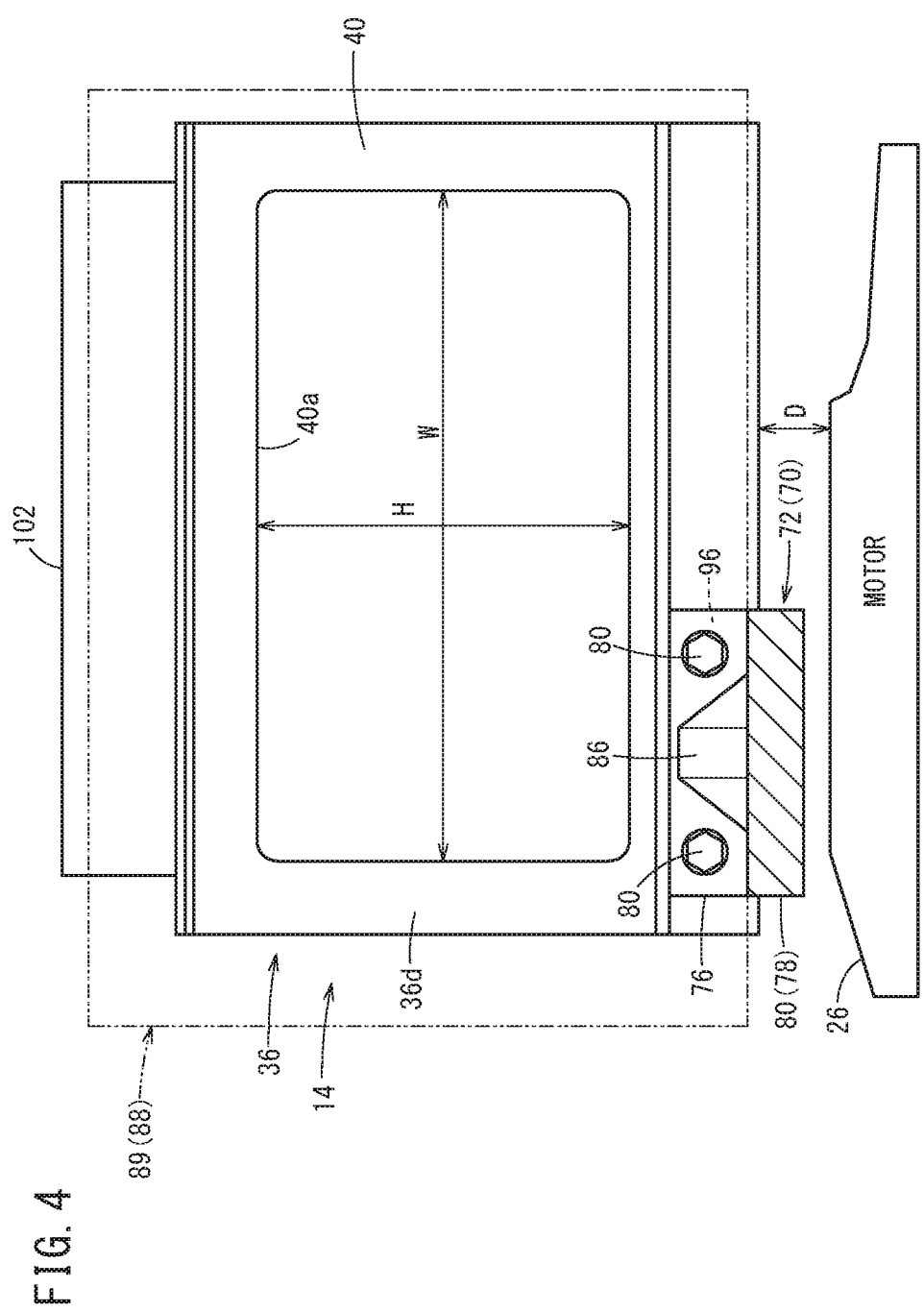
FIG. 4 is a cross sectional view taken along a line IV-IV in FIG. 3.

As shown in FIGS. 2 to 4, the rear mount bracket 72 described above is fixed to a position below the window frame 40 formed in the rear surface 36d of the stack case 36. A protrusion 96 (attachment target) is provided contiguously with the lower portion of the window frame 40. The protrusion 96 protrudes rearward from the flat rear surface 36d (frame surface). The protrusion 96 is in the form of a block having substantially the same width as the rear mount bracket 72. This protrusion 96 is formed integrally with the stack case 36 at the time of forming the stack case 36, and the protrusion 96 is continuous with the rear surface 36d with sufficient strength. A pair of screw holes 86a are provided adjacent to both sides of the rear surface of the protrusion 96 in the width direction. Tightening bolts 80 are screwed into the screw holes 96a to fix the rear mount bracket 72 (case attachment 76).

The protrusion 96 is formed integrally with a position offset in a lateral direction from the center of the window frame 40 (stack case 36) in the width direction. That is, the rear mount bracket 72 is provided at a position offset from the center of the stack case 36 in the width direction as well. In the structure, the center of the fuel cell stack 14 in the width direction is widened vertically. For example, in the state where the rear mount bracket 72 and the protrusion 96 are coupled together, an interval D (FIG. 4) is provided between the upper part of the traction motor 26 and the bottom surface 36c of the stack case 36. The interval D is determined so as to keep the traction motor 26 and the stack case 36 in non-contact with each other, and to increase the vertical size of the motor room 16.

Further, a cell voltage monitor 98 (hereinafter referred to as the CVM 98) is inserted into the rear surface 36d of the stack case 36 through the rear window 40a. For example, the CVM 98 is in the form of a circuit board which can be provided inside the window frame 40 of the stack case 36, and has a function of detecting the voltage of the power generation cells 34 in the fuel cell stack 14. Further, the VCU 88 is connected to the rear side of the CVM 98.

As described above, the window frame 40 includes the protrusion 96 on the lower side of the rear window 40a (on a side closer to the bottom surface 36c). Therefore, it is possible to design the height H and the width W of the rear window 40a to have sufficiently large sizes. In the structure, the CVM 98 can be inserted easily from the rear window 40a while avoiding contact with the window frame 40.

The VCU 88 is connected to an ECU (not shown) to perform switching between connection and disconnection of the fuel cell stack 14, and the VCU 88 is in the form of a converter for boosting the output voltage of the fuel cell stack 14, and supplying the boosted voltage to the PDU 32. The VCU 88 includes a VCU case 89 and a chopper circuit (not shown) placed in the VCU case 89. The VCU case 89 has a rectangular parallelepiped shape having an area larger than that of the rear surface 36d of the fuel cell stack 14. The VCU case 89 is coupled to the rear surface 36d of the fuel cell stack 14 to cover the rear window 40a.

The front wall facing the stack case 36 of the VCU case 89 is tightly fixed to the window frame 40 using bolts (not shown). That is, the VCU case 89 is a member which covers (supports) the rear surface 36d of the stack case 36. Further, a space 89a is formed in a lower position of the VCU case 89. Part (the case attachment 76 and the ridge 86) of the rear mount bracket 72 and the protrusion 96 of the stack case 36 is placed in the space 89a.

A wiring line 100 (envelope) extends from an upper surface (or a front surface) of the upper part of the VCU case 89 for electrically connecting the chopper circuit of the VCU 88 and the PDU 32. The wiring line 100 is connected to a terminal 101 of the VCU 88, and passes through a circuit part 102 (Stack Sensor Board: hereinafter referred to as SSB 102) provided above the fuel cell stack 14, or bypasses the SSB 102 to reach the front surface 36a of the stack case 36, and then, extends downward, and the wiring line 100 is coupled to the PDU 32.

The mount structure 10 of the fuel cell stack 14 according to the embodiment of the present invention basically has the above structure. Hereinafter, operation and advantages of the mount structure 10 will be described.

At the time of producing the fuel cell stack 14, the power generation cells 34 are stacked together, and in this state, the power generation cells 34 are placed in the internal space 37 of the stack case 36 as shown in FIG. 2. In the state where the power generation cells 34 are placed in the internal space 37, the CVM 98 is inserted into the internal space 37 of the stack case 36 from the rear window 40a of the stack case 36, and then, the VCU 88 is fixed to the rear surface 36d of the stack case 36.

At the time of mounting the above fuel cell stack 14 in the vehicle 12, the fuel cell stack 14 is provided at a predetermined height position of the motor room 16. Before the fuel cell stack 14 is mounted in the vehicle 12, the traction motor 26 is attached to the motor room 16 through the front support 30a and the rear support 30b. Then, the fuel cell stack 14 is fixedly positioned on the vehicle body frame 20 by the three mounts (the pair of side mounts 60 and the rear mount 70) of the mount structure 10.

At the time of mounting the fuel cell stack 14 in the vehicle 12, the rear mount bracket 72 is tightened to the rear surface 36d of the stack case 36 to build the rear mount 70. Specifically, the pair of tightening bolts 80 are inserted through the first holes 76a of the rear mount bracket 72 (case attachment 76), and screwed into the screw holes 96a of the protrusion 96. The rear mount bracket 72 may be attached to the stack case 36 before fixing the VCU 88 to the stack case 36. Further, the rear mount bracket 72 is screwed to the rear support 30b by inserting bolts (not shown) into the second holes 78a. In the structure, the rear mount 70 can support the rear side of the fuel cell stack 14 firmly.

Figure 5A:
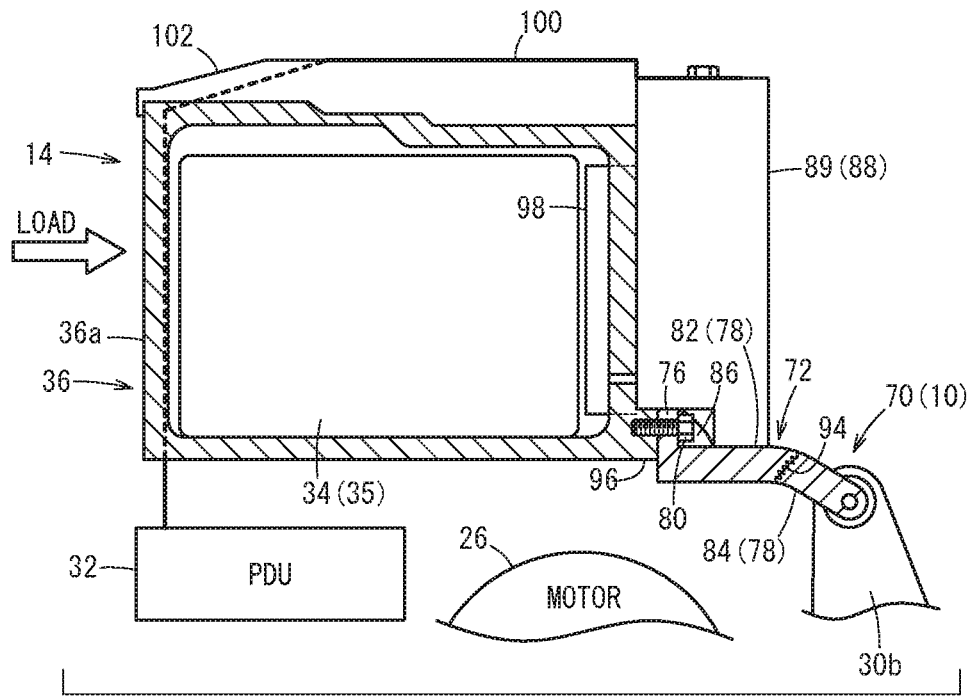
FIG. 5A is a first view showing operation when a load is applied to the fuel cell stack.
Figure 5B:
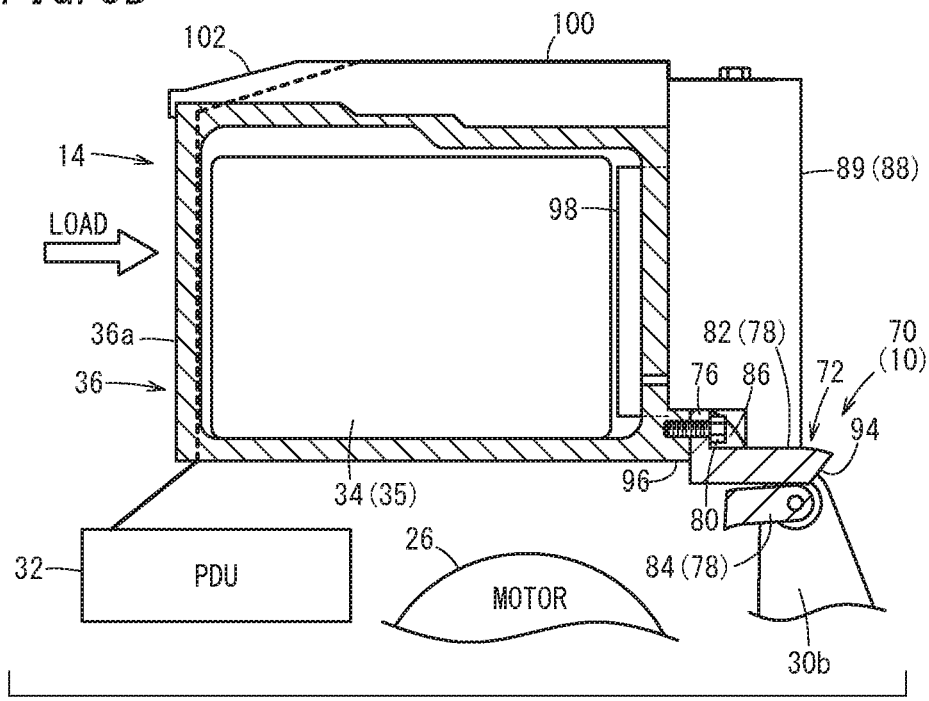
FIG. 5B is a second view showing operation when a load is applied to the fuel cell stack.

In this regard, as described above, the rear mount bracket 72 includes the fragile portion 94 which is more fragile than the window frame 40 of the stack case 36, etc. In the structure, as shown in FIGS. 5A and 5B, for example, in the case where a heavy load is applied from the front end side, e.g., by collision of the vehicle 12, the rear mount bracket 72 is broken apart before the stack case 36 is damaged. Therefore, when an accidental collision occurs, in the fuel cell stack 14, it is possible to avoid damages of the stack case 36, and it becomes possible to suppress leakage of hydrogen due to the damages of the stack case 36 as much as possible.

The mount structure 10 of the fuel cell stack 14 according to the present invention offers the following advantages.

In the mount structure 10 of the fuel cell stack 14, it becomes possible to suitably ensure that a sufficient space can be provided in the vehicle 12, by the window frame 40 of the stack case 36 and the mount bracket 71 of the rear mount 70. That is, since the rear window 40a is provided in the rear surface 36d (one side surface) of the stack case 36, it is possible to insert the device (CVM 98) of the fuel cell system through the rear window 40a, and achieve reduction of the space required for mounting the fuel cell system in the vehicle 12. Further, since the mount bracket 71 is attached to the window frame 40 of the rear surface 36d of the stack case 36 while achieving the desired opening range of the rear window 40a, the mount bracket 71 can firmly and fixedly hold the fuel cell stack 14. In the structure, since the mount bracket 71 for supporting the fuel cell stack 14 is not present below the fuel cell stack 14, the available space is widened. For example, even in the structure where the traction motor 26 of the vehicle 12 is provided below the fuel cell stack 14, it is possible to easily obtain the interval needed for preventing interference between these component parts.

At least the attachment target portion of the window frame 40 to which the mount bracket 71 is attached is provided with the protrusion 96 which is contiguous with the stack case 36 and protruding outward from the stack case 36. By the protrusion 96, the mount bracket 71 can stably hold the fuel cell stack 14, at the position remote from the rear surface 36d of the stack case 36. Further, since the protrusion 96 is provided firmly contiguous with the stack case 36, for example, even if an impact is applied to the vehicle 12, it is possible to reduce the damages of the stack case 36.

The mount bracket 71 includes the fragile portion 94 which is more fragile than the window frame 40. In the structure, for example, when an impact is applied to the vehicle 12, the mount bracket 71 is broken apart before the stack case 36 is damaged. Therefore, it is possible to reliably prevent damages of the stack case 36 to a greater extent.

The mount bracket 71 includes the case attachment 76 attached to the stack case 36, and the vehicle body attachment 78 which is continuous with the case attachment 76 and attached to the support member (rear support 30b) fixed to the vehicle body frame 20. The vehicle body attachment 78 includes the flat portion 82 capable of contacting and supporting the device (VCU 88) of the fuel cell system which protrudes from the rear window 40a. By the flat portion 82 of the vehicle attachment 78, the mount bracket 71 can suitably contact and support the VCU 88 which protrudes outward beyond the rear window 40a of the stack case 36.

The device of the fuel cell system inserted into the stack case 36 from the rear window 40a is the cell voltage monitor (CVM) 98 for monitoring the voltage of the power generation cells 34 placed in the fuel cell stack 14. In the structure, it is possible to effectively utilize the space around the fuel cell stack 14. Further, the CVM 98 can monitor the power generation state of the fuel cell stack 14 accurately.

The voltage control unit (VCU) 88 as the device of the fuel cell system is attached to the window frame 40 in a manner that the voltage control unit (VCU) 88 covers the rear window 40a. In the structure, it is possible to cover one side surface of the fuel cell stack 14 easily, and increase the strength of the stack case 36.

The rear mount bracket 72 (mount bracket 71) is attached to the rear surface 36d of the fuel cell stack 14, at a position offset from the center in the vehicle width direction. In the structure, it is possible to easily create a space where various devices can be provided, around the center of the fuel cell stack 14 in the vehicle width direction.

It should be noted that the present invention is not limited to the above described embodiment. Various modifications can be made in line with the gist of the present invention. For example, in the above embodiment, the fuel cell stack 14 is formed by stacking the plurality of power generation cells 34 in the vehicle width direction. However, the present invention is not limited in this respect. The fuel cell stack 14 may be formed by stacking a plurality of power generation cells 34 in the vehicle length direction. In this case, the mount bracket 71 is configured to fixedly support the side surface of the stack case 36 in the vehicle width direction. Further, in the above embodiment, the rear surface 36d of the stack case 36 is supported by the rear mount 70. However, the present invention is not limited in this respect. The front surface 36a of the stack case 36 may be supported by the mount.

Further, the position where the fuel cell stack 14 is placed in the vehicle 12 is not limited to the motor room 16. The fuel cell stack 14 may be provided at the center or rear side of the vehicle 12 in the front/rear direction. In particular, the mount structure 10 of the fuel cell stack 14 according to the present invention does not require a vertically large space in the vehicle 12. Therefore, it becomes possible to determine the layout of the fuel cell stack 14 itself more freely.

What is claimed is:

1. A mount structure of a fuel cell stack, the mount structure being configured to hold the fuel cell stack to a vehicle body frame of the vehicle, comprising:
   the fuel cell stack;
   a pair of side mounts respectively connected to both sides of the fuel cell stack in a vehicle width direction and fixed to the vehicle body frame; and
   a rear mount fixed to a rear surface of the fuel cell stack and to the vehicle body frame,
   the fuel cell stack comprising:
   a plurality of power generation cells; and
   a stack case containing the plurality of power generation cells in a state where the plurality of power generation cells are stacked together,
   wherein one side surface of the stack case is provided with a window frame having a window configured to allow a device of a fuel cell system to be inserted into the window; and
   the rear mount includes a mount bracket and a rear support, the mount bracket is attached to a lower side of the window frame at a position below the window, and the rear support supports the mount bracket and is fixed to the vehicle body frame.

2. The mount structure of the fuel cell stack according to claim 1, wherein at least an attachment target portion of the window frame to which the mount bracket is attached is provided with a protrusion which is contiguous with the stack case and protruding outward from the stack case.

3. The mount structure of the fuel cell stack according to claim 1, wherein the mount bracket includes a breakable portion which is more breakable than the window frame.

4. The mount structure of the fuel cell stack according to claim 1, wherein the mount bracket comprises:
   a case attachment configured to be attached to the stack case; and
   a vehicle body attachment which is continuous with the case attachment and attached to a support member fixed to the vehicle body frame, and
   wherein the vehicle body attachment includes a flat portion capable of contacting and supporting a device of the fuel cell system which protrudes from the window.

5. The mount structure of the fuel cell stack according to claim 1, wherein the device of the fuel cell system inserted into the stack case from the window is a cell voltage monitor configured to monitor the voltage of the power generation cells placed in the fuel cell stack.

6. The mount structure of the fuel cell stack according to claim 1, wherein a voltage control unit as a device of the fuel cell system is attached to the window frame in a manner that the voltage control unit covers the window.

7. The mount structure of the fuel cell stack according to claim 1, wherein the mount bracket is attached to a rear surface of the fuel cell stack, at a position offset from a center in a vehicle width direction.

* * * * *